United States Patent [19]

Röhm

[11] Patent Number: 4,621,819
[45] Date of Patent: Nov. 11, 1986

[54] NONLOOSENING HAMMER-DRILL CHUCK

[76] Inventor: Günter H. Röhm, Heinrich-Röhm-Str. 50, 7927 Sontheim, Fed. Rep. of Germany

[21] Appl. No.: 654,791

[22] Filed: Sep. 26, 1984

[30] Foreign Application Priority Data

Sep. 27, 1983 [DE] Fed. Rep. of Germany ... 8327665[U]
May 8, 1984 [DE] Fed. Rep. of Germany ....... 3416986

[51] Int. Cl.$^4$ ................ B23B 31/12; G05G 5/18
[52] U.S. Cl. .................... 279/1 K; 74/578;
    279/1 ME; 279/19; 279/60; 279/62
[58] Field of Search ............... 279/19.3, 1 K, 1 ME,
    279/19, 60-64; 81/60-62, 63.1;
    74/575, 576, 577 R, 577 M, 578

[56] References Cited

U.S. PATENT DOCUMENTS

| 1,075,311 | 7/1913 | Beck ................................ 74/578 X |
| 2,276,913 | 3/1942 | Ashworth ........................... 74/578 |
| 3,765,691 | 10/1973 | Saruhashi ....................... 279/116 X |
| 4,213,622 | 7/1980 | Röhm ............................... 279/1 K |

FOREIGN PATENT DOCUMENTS

| 2030485 | 4/1980 | United Kingdom ................. 279/60 |
| 1566855 | 5/1980 | United Kingdom ................. 279/60 |

Primary Examiner—Gil Weidenfeld
Assistant Examiner—Steven C. Bishop
Attorney, Agent, or Firm—Karl F. Ross; Herbert Dubno

[57] ABSTRACT

A hammer drill having a drive spindle rotatable about a spindle axis and a hammer displaceable axially in the drive spindle has a chuck in turn having a generally tubular chuck body centered on a chuck axis, formed with an axially centered array of axially backwardly open recesses, and having a central axially extending passage adapted to receive the shank of a drill bit. The body normally is carried on the spindle and receives the shank of the drill bit in its passage with the spindle, shaft, and chuck axes all coaxial. The hammer projects axially forward into the passage and is engageable therein with the bit. A plurality of jaws radially but not angularly displaceable in the chuck body have inner ends engageable with the drill-bit shank. An adjustment ring centered on the chuck axis, rotatable thereabout on the chuck body, and coupled to the jaws can move same radially synchronously and thereby center the bit in the body by engagement of the inner ends with the shank. At least one latch or detent is rotationally fixed but axially displaceable on the body between a locking position engaging in the array of recesses for locking the ring and body against relative rotation and a freeing position out of blocking engagement with the recesses and permitting such rotation.

4 Claims, 5 Drawing Figures

NONLOOSENING HAMMER-DRILL CHUCK

FIELD OF THE INVENTION

The present invention relates to a drill chuck. More particularly this invention concerns a hammer-drill chuck.

BACKGROUND OF THE INVENTION

A standard hammer drill has a drive spindle that is rotated about a spindle axis and a hammer displaceable axially in the drive spindle. A chuck is carried out on the spindle so as to rotate therewith, and holds a drill bit having a shaft having a radially outwardly open and at least generally axially extending groove. The chuck holds the drill bit so it is centered on the spindle axis, and the hammer is effective on the rear end of the drill bit. The bit is rotationally coupled to the chuck body, which as mentioned above is rotated, and is at least limitedly axially reciprocated by the hammer so that it can drill through masonry or the like.

Since at least limited axial reciprocation is necessary for the drill bit, it is necessary that the bit not be solidly axially coupled to the chuck, as then the hammering would have to reciprocate the chuck also. Accordingly, the system of my copending U.S. patent application Ser. No. 591,975 filed Mar. 21, 1984 describes a chuck used with a hammer drill having a drive spindle rotatable about a spindle axis and a hammer displaceable axially in the drive spindle, and with a drill bit having a shaft extending along a shaft axis and having a radially outwardly open and at least generally axially extending groove. The chuck has a generally tubular chuck body centered on a chuck axis and having a central axially extending passage. This body is normally carried on the spindle and receives the shaft of the drill bit in its passage with the spindle, shaft, and chuck axes all coaxial. The hammer projects axially forward into the passage and is engageable therein with the bit. A plurality of jaws radially but not angularly displaceable in the chuck body have inner ends engageable with the drill-bit shaft and in turn provided with formations complementarily engageable in the groove thereof. An actuator is connected to the jaws for moving same radially synchronously and thereby centering the bit in the body by engagement of the inner ends with the shaft and for engaging the formations in the grooves for rotationally linking the body and bit while permitting limited relative axial movement.

Such an arrangement is somewhat complex. In addition it is not impossible for the jaws to move out somewhat during prolonged hammer drilling, so that the bit will wobble about and make a sloppy hole.

OBJECTS OF THE INVENTION

It is therefore an object of the present invention to provide an improved hammer-drill chuck.

Another object is the provision of such a hammer-drill chuck which overcomes the above-given diadvantages, that is whose bit-holding jaws cannot loosen during use.

SUMMARY OF THE INVENTION

A hammer drill having a drive spindle rotatable about a spindle axis and a hammer displaceable axially in the drive spindle has a chuck in turn having a generally tubular chuck body centered on a chuck axis, formed with an axially centered array of axially backwardly open recesses, and having a central axially extending passage adapted to receive the shank of a drill bit. The body normally is carried on the spindle and receives the shank of the drill bit in its passage with the spindle, shaft, and chuck axes all coaxial. The hammer projects axially forward into the passage and is engageable therein with the bit. A plurality of jaws radially but not angularly displaceable in the chuck body have inner ends engageable with the drill-bit shank. An adjustment ring centered on the chuck axis, rotatable thereabout on the chuck body, and coupled to the jaws can move same radially synchronously and thereby center the bit in the body by engagement of the inner ends with the shank. At least one latch or detent is rotationally fixed but axially displaceable on the body between a locking position engaging in the array of recesses for locking the ring and body against relative rotation and a freeing position out of blocking engagement with the recesses and permitting such rotation.

According to another feature of this invention the body is formed with an axially extending guide in which the detent is displaceable between its positions and the ring carries an axially backwardly extending sleeve centered on the axis and defining with the body and at the guide an annular compartment in which the detent is contained. A spring is braced axially between the detent and the chuck body for urging the detent axially forward into the locking position. In addition the recesses and detent have engageable angled flanks so that forcible rotation of the ring on the body about the axis cams the detent into the freeing position. The angles and the spring forces are such that during hammer drilling the detent will not disengage from the adjustment ring, but when considerable torque is applied, for example by a chuck key, the detent is pushed back and ratchets in the recesses.

In accordance with a further feature of this invention there are a plurality of such detents angularly spaced about the chuck body. Although they could be equiangularly spaced about the axis, for simultaneous engagement and disengagement, it is preferable when they are not equiangularly spaced about the axis on the chuck. Under any circumstances the recesses of the chuck body are angularly equispaced about the axis.

The angle between the nonequiangularly spaced is equal to a whole-number multiple of the angle between adjacent recesses plus or minus this angle divided by the number of detents.

DESCRIPTION OF THE DRAWING

The above and other features and advantages will become more readily apparent from the following, reference being made to the accompanying drawing in which.

SPECIFIC DESCRIPTION

Figure 1:
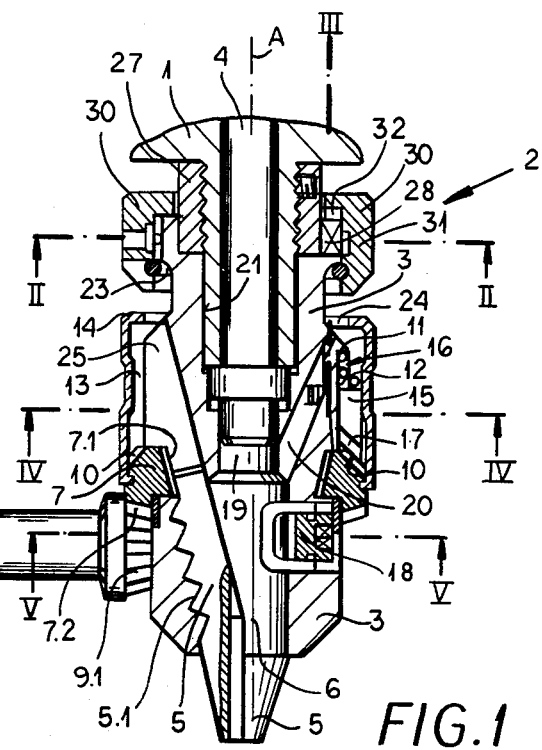
FIG. 1 is an axial section through the drill-chuck assembly according to this invention.
Figure 3:
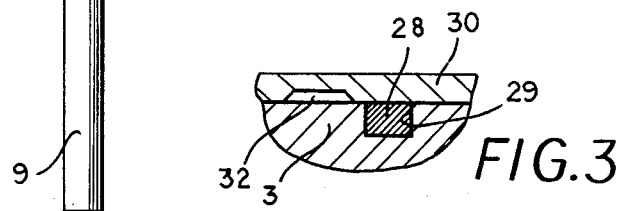
FIG. 3 is a large-scale axial section taken along line III—III of FIG. 1.
Figure 5:
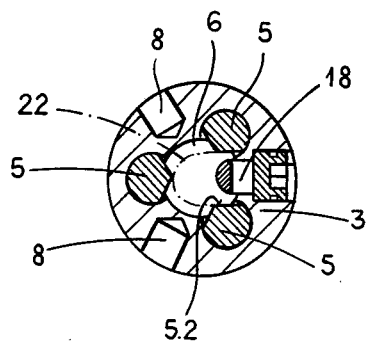

As seen in FIG. 1 a drill chuck 2 has a body 3 centered on an axis A and mounted on a spindle 1 that rotates about this axis A. This body 3 is basically tubular, having at its rear end a smooth cylindrical bore in which the spindle 1 is guided so as to permit limited relative axial movement of the spindle 1 and body 3, an intermediate portion 19 of smaller diameter in which the hammer 4 is guided, and a large-diameter front portion 6 adapted to receive the cylindrical and axially grooved shank of a hammer-drill bit shown in dot-dash lines at 22 in FIG. 5 only.

Three angularly equispaced jaws 5 are slidable in respective guide holes 25 along respective axes lying on an imaginary cone centered on the axis A and having an apex angle of about 30°, the unillustrated jaw axes being angularly equispaced about the axis A. Each jaw 5 has a radially outer edge formed with a row of transverse teeth 5.1 and a radially inner V-shaped sharp edge 5.2 that is cut back to extend always parallel to the axis A. Axial displacement of the jaws 5 in the guides 25 therefore moves the edges 5.2 radially.

An adjustment ring 7 is formed with a radially inner spiral formation 7.1 meshing with the teeth 5.1 and is rotatable on the chuck body 3 about the axis A. The pitch of the spiral 7.1 and of the teeth 5.1 and the position of the teeth 5.1 of one jaw 5 relative to the others are all such that the edges 5.1 always define a cylinder centered on the axis A. This ring 7 can be rotated manually by gripping it and a sleeve 14 extending backward from it and simply twisting in one direction to the other. In addition the axially forward edge of the ring 7 is formed with teeth 7.2 that can mesh with the crown teeth 9.1 of a standard gear-type chuck key 9. Holes 8 (FIG. 5 only) in the chuck body 3 allow the tip of the key 9 to be inserted as is known per se.

Thus the jaws 6 are moved into light guiding engagement with the shank 22 to center it in the chuck 2. An entrainment element 18 engages radially inward into the axial groove of the shank 22 to angularly couple it to the chuck body 3.

Figure 4:
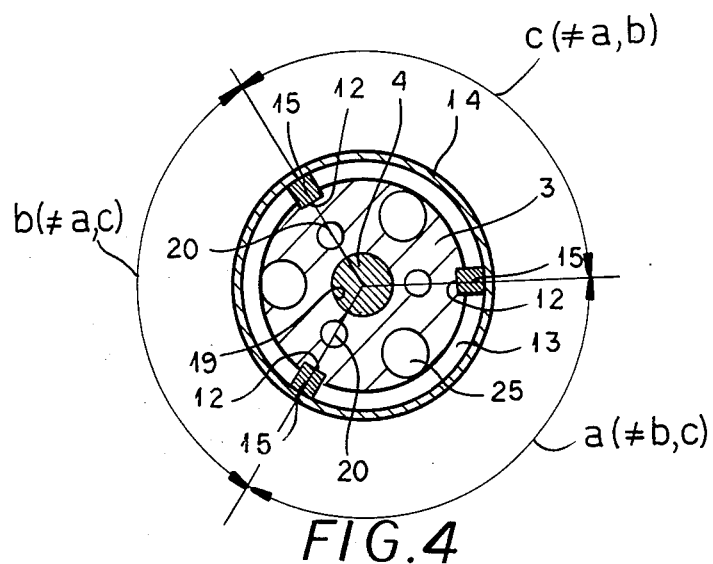
FIGS. 4 and 5 are cross sections taken respectively along lines IV—IV and V—V of FIG. 1.

The guide holes 25 are blocked by the jaws 5 so that the chuck body 3 is formed angularly therebetween with drain holes 20 (FIGS. 1 and 4) that open at their axially front ends into the rear end of the front passage portions 6, at the base of the drill-bit shank 22 and at their axially rear ends at the extreme rear end of a chamber 13 formed in the sleeve 14, just ahead of the gap 24 formed between the sleeve 14 and the body 3. The particles that fall back into the chuck when drilling overhead can therefore pass axially back out of the passage 6 through the holes 20 and thence through the gap 24 to the outside, rather than collecting in the chuck mechanism.

Figure 2:
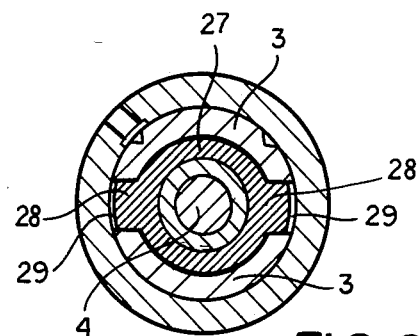
FIG. 2 is a cross section taken along line II—II of FIG. 1.

Fixed on the spindle 1 is an entrainment hub 27 having two diametrically oppositely projecting entrainment stubs 28 best seen in FIG. 2. The chuck body 3 itself is formed with two axially backwardly and radially outwardly open guide slots 29 that snugly receive these stubs 28. The axially extending and angularly confronting surfaces of the stub 28 and slots 29 slide axially on one another, permitting limited axial movement 12 of the body 3 and that are contained in the annular compartment 13 formed between the sleeve 14 and the body 3. The axially rear face of the ring 7 is formed with recesses or V-shaped teeth 10 and the axially front end of each detent 15 is formed as a V-shaped tooth 17 complementary to and engageable between the teeth 10. Respective springs 16 each have a rear end braced axially backward against a shoulder 11 defining the rear end of the respective groove 12 and a front end braced axially forward against the rear end of the respective detent 15.

The angles of the teeth 10 and 17 and the forces of the springs 16 are such that durng hammer drilling at least one tooth 17 is engaged between two teeth 10, thereby angularly arresting the ring 7 on the body 3 so that the position of the edges 5.1 will not change. Nonetheless when a considerable torsion is applied to the ring 7 or sleeve 14, for instance by means of the key 9, any detent 15 engaged between two teeth 10 will push back and allow rotation of the ring 7.

Although it is possible for the three detents 15 to be angularly equispaced about the axis A, so that they all jointly engage fully between two teeth 10 at the same time, it is possible to obtain a finer ratcheting, in which at any one time only one tooth 17 can be fully engaged between two teeth 10, by nonequiangular spacing. More specifically when n = number of detents,
k = a whole number, and
b = angle between adjacent teeth 10, the angle a between the detents is determined by:

$$a = Kb + b/n.$$

Thus for an arrangement of the type shown with three detents (n = 3), and thirty teeth 10 (b = 12°), the formula becomes:

$$a = K(12°) + 4°.$$

Thus the three detents could be grouped closely, with the two outer ones spaced 16° from the center one and 328° from each other, or they could be spaced generally equiangularly at 116°, 116°, and 128°. Such nonequiangular spacing in this arrangement therefore defines a total of ninety different stable positions for the ring on the chuck body, one capable of maintaining virtually any position, as the mechanical advantage between the spiral thread 7.1 and the teeth 5.1 is very large.

I claim:

1. In combination with a hammer drill having a drive spindle rotatable about a spindle axis and a hammer displaceable axially in the drive spindle and with a drill bit having a shank, a chuck comprising:

a generally tubular chuck body centered on a chuck axis, formed with an axially extending guide, and having a central axially extending passage adapted to receive the shank of the drill bit, the body normally being carried on the spindle and receiving the shank of the drill bit in its passage with the spindle, shaft, and chuck axes all coaxial, the hammer projecting axially forward into the passage and being engageable therein with the bit;

a plurality of jaws radially but not angularly displaceable in the chuck body and having inner ends engageable with the drill-bit shank;

actuating means including a ring centered on the chuck axis, formed with an axially centered array of axially backwardly open recesses, rotatable thereabout on the chuck body, and coupled to the jaws for moving same radially synchronously and thereby centering the bit in the body by engagement of the inner ends with the shank;

latch means including at least one detent rotationally fixed but axially displaceable in the guide on the body between a locking position engaging in the array of recesses for locking the ring and body against relative rotation and a freeing position out of blocking engagement with the recesses and permitting such relative rotation, the recesses and detent having engageable angled flanks, whereby forcible rotation of the ring on the body about the axis cams the detent into the freeing position;

a sleeve extending axially backward from the ring centered on the axis and defining with the body and at the guide an annular compartment in which the detent is contained; and biasing means including a spring braced axially between the detent and the chuck body for urging the detent axially forward into the locking position.

2. The hammer-drill chuck defined in claim 1 wherein there are a plurality of such detents angularly spaced about the chuck body.

3. The hammer-drill chuck defined in claim 2 wherein the detents are not equiangularly spaced about the axis on the chuck but the recesses of the chuck body are angularly equispaced about the axis.

4. The hammer-drill chuck defined in claim 2 wherein the recesses are spaced apart by a predetermined recess angle b and the detents are spaced from each other by an angle a bearing the following mathematical relationship to each other:

$$a = Kb + b/n,$$

wherein
K is a whole number and
n is the number of detents.

* * * * *